UNITED STATES PATENT OFFICE.

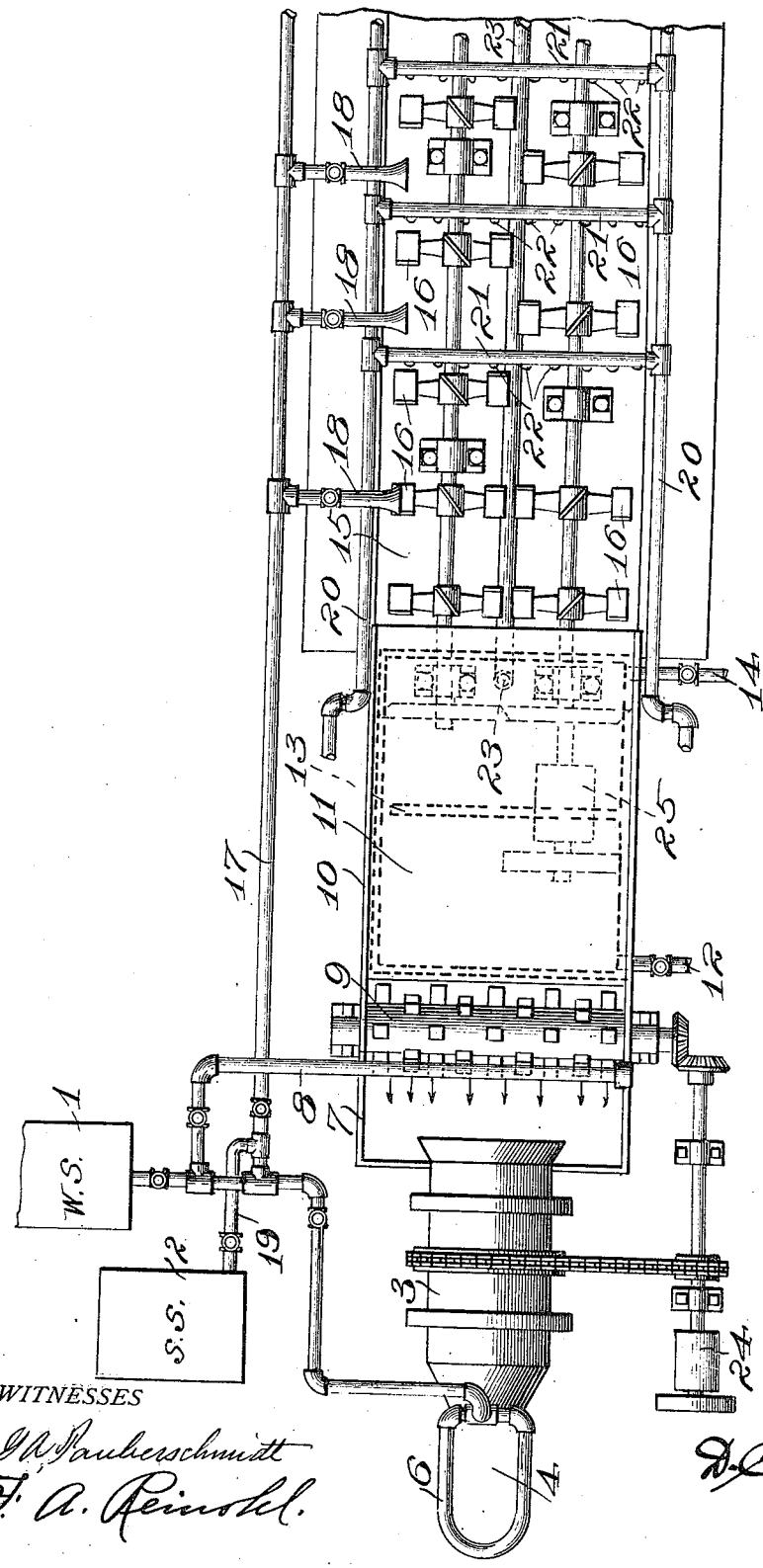

DAVID C. REINOHL, OF WASHINGTON, DISTRICT OF COLUMBIA.

PROCESS OF TREATING ORES FOR SEPARATING PRECIOUS METALS.

1,081,514.  Specification of Letters Patent.  Patented Dec. 16, 1913.

Application filed March 7, 1911, Serial No. 612,952. Renewed May 10, 1912. Serial No. 696,502.

*To all whom it may concern:*

Be it known that I, DAVID C. REINOHL, a citizen of the United States, residing at Washington, in the District of Columbia, have invented certain new and useful Improvements in Processes of Treating Ores for Separating Precious Metals; and I do hereby declare the following to be a full, clear, and exact description of the invention, such as will enable others skilled in the art to which it appertains to make and use the same.

This invention relates to the art of extracting, separating or removing precious metals or values from their ores, has for its object economy or saving in the chemical solution used, reduction in the time required for treating the ore to effect contact between the solution and the values contained in the ore, and the saving of labor in handling the ore.

The invention consists in certain improvements in the process of treating ores for the purpose specified, which will be fully disclosed in the following specification and claims.

In the prevailing practice of treating ore for recovering values, pulverized ore is conducted to a concentration table, from which the heavy particles of gold and silver, are conducted to a concentrate box, and the light particles, slimes and tailings are conducted to a series of leaching tanks, where they are subjected to a solution of cyanid of sodium or cyanid of potassium, or other chemical used for the purpose, and are thoroughly saturated with the solution, and aerated by forcing air through the ore during the operation of leaching. This operation consumes about forty-eight hours. The solution containing the values is conducted to the gold and silver tanks, and a stronger solution of cyanid is supplied to the leaching tanks, for washing out or increasing the contact between the solution and the values remaining in the leaching tanks, and is continued until the assays show that the values have been removed from the sand. The washing out of the sand in the leaching tanks and conducting the values in solution into the gold and silver tanks requires from forty-eight to one hundred hours, according to the nature of the ore being treated. As the assays of the sand in the leaching tanks are being made, assays are also made of the solution in the gold and silver tanks, and in this way the progress of the work is determined. From the gold and silver tanks, the solution is conducted into boxes containing zinc shavings, where the values in solution attach or adhere to the zinc, while the cyanid solution passes off into sump tanks.

By this process the leaching tanks and the gold and silver tanks are not required, the time for leaching the ore, forty-eight hours, and the time required for washing out the values in the leaching tanks and conducting them to the gold and silver tanks, from forty-eight to one hundred hours is eliminated, and the contact between the solution and the values made while the ore and the solution are in transit from a source of supply to a suitable filter, in about twenty minutes.

In the treatment of ores, saturated pulverized ore from a mixer is further saturated with a weak solution of cyanid, of a strength of about one tenth of one per cent. of cyanid, by spraying the solution on the ore as it is discharged into the conduit and the ore and the solution are thoroughly agitated, commingled, aerated and oxygenated by the revolution of the agitator, while exposed to the atmosphere. As the treatment of the ore progresses, the strength of the solution is augmented, by supplying additional solution through several branch pipes, which solution may proceed from a tank containing weak solution, or from a tank containing a solution of a strength of about one per cent. of cyanid, which in conjunction with the continuous agitation, commingling and aeration of the ore and the solution accelerates the contact between the solution and the values, and the added solution also increases the fluidity of the ore being treated. In completing contact between the solution and the values, the pulp travels slowly down the inclined conduit by gravity, assisted by the propulsive force of the spirally arranged blades of the agitator. The strength of the solution and the speed of the agitator must be varied to suit different qualities of ore, in some of which there is greater affinity of the values for the solution than in others. The constant agitation, aeration, oxygenation and the commingling of the ore and the solution hasten contact between the solution and the precious metals and set free and expel any hostile gases contained in the solution, or which may be evolved by the contact of the solution with the ore.

The cyanid solution after having passed through the several stages of the operation, is returned by a suitable pump to the weak solution tank to be used again.

In the treatment of some ores it may be advantageous to supply hot air to the ore and the solution while being agitated and aerated, to supply additional oxygen and heat to hasten or expedite the union or contact between the solvent and the values. This may be readily effected by a pipe on each side of the conduit arranged above the agitator and connected by a plurality of transverse pipes provided with nipples to project streams of air into the ore and the solution as they flow down the conduit, or the pulp may be heated by providing a steam conducting pipe in the conduit.

By the thorough commingling of the particles of ore and the solvent by constant agitation and aeration while in transit, union or contact between the solvent and the values is formed in the conduit in from fifteen to twenty minutes, according to the character of the ore, the length of the conduit, and the speed at which the pulp travels, thus effecting a saving of about one hundred and twenty hours in time as compared with the use of leaching tanks, a great reduction in the quantity of solvent required, an increase in the percentage of values recovered from the ores, and the saving in labor required to remove the sand from the leaching tanks after treatment of the ore therein.

Apparatus for carrying out the process, is shown, described and claimed in another application for a patent, filed herewith and numbered 612,950.

By this process the ore is crushed to about one hundred mesh, thus exposing the gold and silver in small atoms, and as the cyanid treatment consumes only about twenty minutes, the baser metals have no time to act on the cyanid solution while the cyanid is being brought into perfect contact with the atoms of gold and silver, and the dissolving of the latter takes place almost instantaneously and the solids are changed into a liquid. Practical demonstration of the invention has shown that the strength of the cyanid solution is reduced less than three per cent.

The accompanying drawing which forms part of this specification, represents a diagrammatic plan view of means for carrying out the process disclosed, and in said drawing 1 indicates a tank for weak cyanid solution, 2 a tank for strong cyanid solution. 3 a revoluble mixer provided with a hopper 4 into which crushed ore or finely comminuted ore is fed by any suitable means, is supplied with a weak cyanid or other alkaline solution through pipe 6 connected to tank 1, and the ore and the solution are thoroughly commingled in the mixer while exposed to the atmosphere within the mixer.

From the mixer the pulp is continuously discharged upon a launder 7, where a further charge of solution is supplied thereto through pipe 8, and the pulp is further agitated by a transverse agitator 9 and flows down over the table like part 10 of the launder where it may be heated by steam or other heating medium supplied to the pocket or compartment 11, through pipe 12, passes around the baffle-plate 13 and is discharged through pipe 14. From the launder, the pulp flows into the open and unobstructed conduit 15, which is provided with agitators and conveyers 16, whose blades are inclined in opposite directions and throw the pulp toward the center of the conduit approximately throughout the length of the conduit and thoroughly and continuously agitate, aerate and oxygenate the pulp in its passage over the conduit.

17 indicates a pipe provided with a plurality of branches and nozzles 18 for supplying solution to the pulp progressively and augmenting the strength of the solution. The pipe 17, communicates with the strong solution tank 2, by means of a pipe 19, by which a solution stronger than that from tank 1 may be supplied to the pulp while in transit over the conduit.

20, 20, indicate pipes for supplying air under pressure to the pulp. The pipes are connected by transverse members 21, provided with nipples 22 for projecting the air into the pulp.

23 indicates a pipe for supplying steam or other heating medium for heating the pulp in the conduit.

24 indicates a motor for revolving the mixer 3 and the agitator 9, and 25 indicates a motor for revolving the agitators 16.

Having thus fully described my invention, what I claim is

1. The process of treating ores, which consists in saturating pulverized ore with a solvent, moving the pulp, maintaining the strength of the solvent while the ore and the solvent or pulp are in transit and exposed to the atmosphere, and agitating and aerating the pulp until contact between the solvent and the values is consummated.

2. The process of treating ores, which consists in saturating pulverized ore with a solvent, moving the pulp, maintaining the strength of the solvent while the ore and the solvent or pulp are in transit and exposed to the atmosphere, heating the pulp, and agitating and aerating the pulp until contact between the solvent and the values is consummated.

3. The process of treating ores, which consists in saturating pulverized ore with a cyanid solution, augmenting the strength of the solution and maintaining agitation and aeration of the pulp while in transit and exposed to the atmosphere until contact between the cyanid and the precious metals is consummated.

4. The process of treating ores, which consists in saturating pulverized ore with a cyanid solution, augmenting the strength of the solution, heating the pulp, and maintaining agitation and aeration of the pulp while in transit and exposed to the atmosphere until contact between the cyanid and the precious metals is consummated.

5. The process of treating ores, which consists in saturating pulverized ore with a cyanid solution, agitating and aerating the pulp, augmenting the strength of the solution progressively and maintaining the agitation and aeration of the pulp while in transit and exposed to the atmosphere until contact between the cyanid and the precious metals is consummated.

6. The process of treating ores, which consists in saturating pulverized ore with a cyanid solution, agitating and aerating the pulp, heating the pulp, augmenting the strength of the solution progressively and maintaining the agitation and aeration of the pulp while in transit and exposed to the atmosphere until contact between the cyanid and the precious metals is consummated.

7. The process of treating ores, which consists in saturating pulverized ore with a cyanid solution, supplying solution of a strength in excess of the original solution and maintaining agitation and aeration of the pulp while in transit and exposed to the atmosphere until contact between the cyanid and the precious metals is consummated.

8. The process of treating ores, which consists in saturating pulverized ore with a cyanid solution, augmenting the strength of the solution and increasing the fluidity of the pulp being treated, and maintaining agitation and aeration thereof while in transit and exposed to the atmosphere until contact between the cyanid and the precious metals is consummated.

9. The process of treating ores, which consists in saturating pulverized ore with a cyanid solution, augmenting the strength of the solution and increasing the fluidity of the pulp being treated, heating the pulp, and maintaining agitation and aeration thereof while in transit and exposed to the atmosphere until contact between the cyanid and the precious metals is consummated.

10. The process of treating ores, which consists in saturating pulverized ore with a solvent, augmenting the strength of said solvent, and continuously agitating and aerating the pulp in the presence of the solvent and while in transit and exposed to the atmosphere until contact between the solvent and the precious metals is consummated.

11. The process of treating ores, which consists in saturating pulverized ore with a solvent, augmenting the strength of said solvent, heating the pulp, and continuously agitating and aerating the pulp in the presence of the solvent and while in transit and exposed to the atmosphere until contact between the solvent and the precious metals is consummated.

12. The process of treating ores, which consists in saturating pulverized ore with a solvent, heating the pulp, agitating and aerating the pulp while in transit and exposed to the atmosphere and projecting currents of air into the same while in transit.

13. The process of treating ores, which consists in saturating pulverized ore with a solvent, heating the pulp, agitating and aerating the pulp while exposed to the atmosphere and supplying hot air thereto while in transit, and continuing the agitation and the aeration until contact between the solvent and the precious metals is consummated.

14. The process of treating ores, which consists in pulverizing ore, saturating the ore with a solvent, heating, continuously agitating and aerating the pulp in transit and exposed to the atmosphere until contact between the solvent and the values is consummated.

In testimony whereof I affix my signature, in presence of two witnesses.

D. C. REINOHL.

Witnesses:
 W. PARKER REINOHL,
 FRANCIS A. REINOHL.

Copies of this patent may be obtained for five cents each, by addressing the "Commissioner of Patents, Washington, D. C."